United States Patent

[11] 3,582,154

| [72] | Inventor | Paul E. Russ, Sr.<br>Englewood, Colo. |
|---|---|---|
| [21] | Appl. No. | 733,928 |
| [22] | Filed | June 3, 1968 |
| [45] | Patented | June 1, 1971 |
| [73] | Assignee | The Gates Rubber Company<br>Denver, Colo. |

[54] ENDLESS TRACK FOR MULTITERRAIN VEHICLES
17 Claims, 6 Drawing Figs.

[52] U.S. Cl. .................................................. 305/35EB, 74/231C, 74/231P, 305/38
[51] Int. Cl. ...................................................... B62d 55/24
[50] Field of Search............................................ 74/231, 231 C, 234, 229, 232, 233, 237; 305/35, 37, 38, 57; 198/193

[56] References Cited
UNITED STATES PATENTS

| 2,135,057 | 11/1938 | Slayter | 74/231 |
| 2,290,109 | 7/1942 | Mayne | 74/231(C)UX |
| 2,899,242 | 8/1959 | Bombardier | 305/38 |
| 3,066,710 | 12/1962 | Beckadolph | 74/237 |
| 3,105,536 | 10/1963 | Cappa | 305/35 |
| 3,436,128 | 4/1969 | Boulanger | 74/237X |
| 3,451,728 | 6/1969 | Bruneau | 305/35X |
| 3,472,563 | 10/1969 | Irgens | 305/57X |
| 3,480,339 | 11/1969 | Kell | 305/35 |
| 3,144,930 | 8/1964 | Michels | 305/38UX |
| 3,285,677 | 11/1966 | Marier | 305/38 |
| 2,815,988 | 12/1957 | Dowell | 305/27 |
| 3,464,743 | 9/1969 | Hallaman | 305/35 |

Primary Examiner—Richard J. Johnson
Attorney—Raymond Fink

ABSTRACT: A lightweight endless elastomeric track for multiterrain vehicles, said track having laterally oriented textile stiffening members and having a tread pattern especially suited for mud, snow or the like, and said track capable of being propelled by a plurality of drive means.

INVENTOR.
PAUL E. RUSS, SR.
BY Raymond Fiala
ATTORNEY

INVENTOR.
PAUL E. RUSS, SR.
BY Raymond Fink
ATTORNEY

ENDLESS TRACK FOR MULTITERRAIN VEHICLES

This invention relates to wheel substitutes for land vehicles, but more particularly, this invention relates to flexible and endless track for motor driven land vehicles.

Heretofore, flexible tracks for multiterrain vehicles typically fell into one of two categories. Tracks of the first category comprised a length of flat-belting material to which were riveted parallel metal elements oriented transversely with respect to the belting material. The metal elements served as transverse stiffening members and as driven members of a positive drive system. The tracks were made endless by a ply buildup process or by a mechanical type hinge having its respective elements attached to each end of the belting material.

Tracks of the second category comprised a cloth reinforced rubber body formed in an essentially flat endless strip which strip embodied parallel metal rods oriented transversely with respect to the track body. The metal elements served as transverse stiffening members and indirectly as driven members of a positive drive system.

Some problems are associated with the aforementioned tracks. The transversely oriented metal elements in the track add undesirable weight and are susceptible to becoming bent and dislocated when the track is used over rough terrain. Bent or dislocated metal elements may foul the track drive system or lead to early track failure. A mechanical splice in the track or dislocated metal elements usually results in a dynamically unbalanced track which causes unwanted mechanical vibration when the track is rotated at high speed. Another problem associated with a track transversely reinforced with metal elements is maintaining even spacing between the metal elements for coaction with a positive drive system.

Tracks of flat belt origin have no tread pattern other than that resulting from the uniform spacing of the transversely oriented metal-stiffening elements on the outer surface of the belting material. Tracks having embodied and transversely oriented metal elements typically have a somewhat limiting tread pattern since the tread pattern is designed around the transversely oriented elements.

Accordingly, an object of this invention is to provide an endless track with a suitable transverse stiffness without the aid of metal elements.

Another object of this invention is to provide a track having a tread pattern that exhibits superior traction ability in snow, mud or the like.

Still another object of this invention is to provide a track capable of being positively propelled by a plurality of drive means such as through lugs or sprocket teeth-receiving openings.

Further objects of this invention will become apparent to those skilled in the art upon review of the appended drawings and description thereof.

This invention fulfills the aforementioned objectives through its novel design. The track comprises: an elastomeric body formed in a substantially flat and endless strip, a reinforcement matrix suspended within the body, a plurality of surface configurations on the body for receiving a drive means, and a tread pattern formed on the outer surface of said elastomeric body to enhance traction and stability. The reinforcement matrix comprises a plurality of specially placed strengthening members. Suitable transverse stiffness is achieved by a plurality of high modulus textile members oriented at substantially 90° with respect to the longitudinal axis of said body. The high modulus textile members weigh much less than metal elements and said high modulus textile members do not become dislodged, distorted or dislocated when the track is used over rough terrain. Longitudinal track stretching is held to a minimum by a plurality of high tensile strength, low bend modulus, textile members. Minimum longitudinal track stretching allows a proper spacing to be maintained between the plurality of surfaces on the body which surfaces receive the drive means. A metal cable is longitudinally disposed within said elastomeric body near each outside edge of said elastomeric body to act as a deterrent to lateral tearing of the body. A tread pattern especially adapted for use in mud, snow or the like is formed on the external surface of said elastomeric body. The tread pattern is not limited in design by the placement of metal stiffening elements. The track may be formed as an endless unit using the method disclosed in U.S. Pat. No. 3,200,180; or it may be formed using typical rubber or other polymeric material forming methods.

The detail design of this invention is best understood in conjunction with the drawings.

Figure 1:
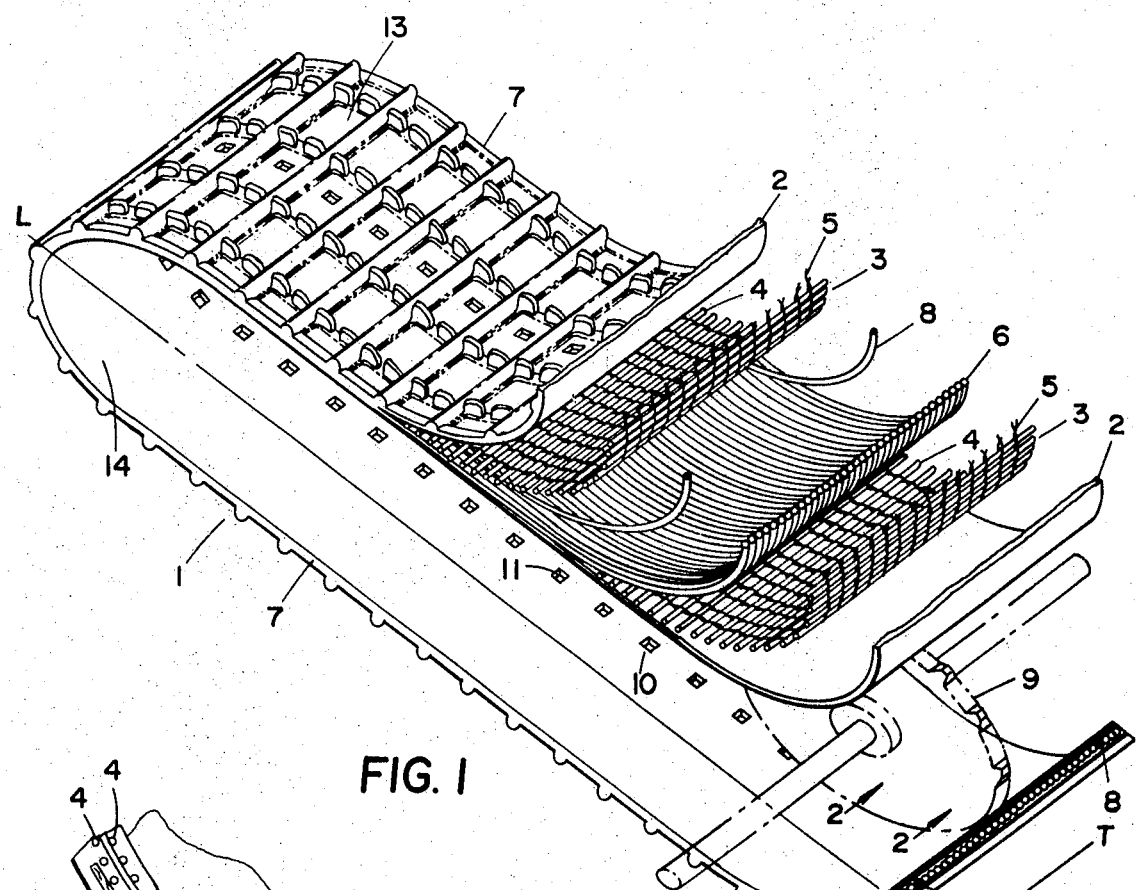
FIG. 1 is a perspective view of a segment of endless track with the elastomeric material hypothetically separated from the reinforcement matrix and showing the track engaged with a theoretical sprocket wheel.

Referring to FIG. 1, a preferred embodiment of this invention is depicted as a section of endless flat track 1 having its longitudinal axis located in the direction indicated by L–L and its transverse axis located in the direction T–T. The track 1 is shown as being separated at a hypothetical end to disclose the key aspects of this invention. The success of the invention is achieved through a structural reinforcement matrix embodied within an elastomeric body 2. The body 2 is in the form of a substantially flat and endless strip and is structurally reinforced transversely with a plurality of textile cords 3. Preferably, the textile cords 3 comprise the "fill" cords 4 of leno weave type fabric. Characteristically, fill cords of leno fabric are arranged and spaced-apart in a parallel fashion by perpendicular weft cords that are of a smaller denier than the fill cords and which weft cords are also arranged in a parallel fashion. The textile fill cords 4 are arranged at substantially 90° to the longitudinal axis of the body 2 whereas the textile weft cords 5 are substantially parallel to the longitudinal axis of the body 2. The bend modulus of the fill cords 4 is many times the bend modulus of the weft cords 5. For satisfactory track operation the summation of fill cords 4 per longitudinal inch of body 2 must yield a minimum bend modulus. To measure the bend modulus of the composite fill cords 4, a length of leno fabric is securely held at one end and a force is applied to its free end 1 inch away to rotate the free end through an arc of 90°. The torque required to bend the leno fabric through an arc of 90° is defined as the bend modulus. Experimentation has revealed that a satisfactory transverse stiffness for the track is achieved if the summation of parallel fill cords 4 per longitudinal inch of body 2 yields a bend modulus of 1.2 inch-pounds per longitudinal inch of body 2.

Longitudinal track stretching is held to a minimum by a structural matrix comprising a plurality of textile tensile members 6 arranged longitudinally with respect to, and disposed within, the body 2. The textile tensile members 6 may consist of a plurality of overlapping textile strands or may consist of a substantially endless tensile member formed by one continuous textile strand wound within the body 2. The tensile member 6 has a low bend modulus that allows the track to be easily flexed along a longitudinal axis and has a high tensile strength to allow minimum longitudinal stretching of the track 1. By maintaining control over longitudinal track stretching, the track is readily adaptable to a plurality of drive means because a constant longitudinal spacing on the track 1 may be held to match the pitch of a positive drive wheel at relatively high horsepower load levels.

If the track 1 were used over rough terrain, a likelihood exists that objects such as rocks will induce lateral tearing along the edges 7 of the track 1. A metal cable 8 is located near each edge 7 of the track 1 and disposed within the body 2 to preclude propagation of any lateral tearing that might lead to early track failure.

The body 2 may be formed of any suitable elastomeric material such as natural and synthetic rubber, including styrenebutadiene rubber, chloroprene, acrylonitrile or polyurethane. The track may be formed as an endless unit using typical rubber or polymeric material forming techniques or using the method disclosed in U.S. Pat. No. 3,200,180. Conventional rubber compounds having the desired characteristic of low temperature flexibility are well known in the art. A material especially suitable for the body 2 is a urethane rubber having good abrasion resistance and good low temperature flexibility. The formulation of a typical polyurethane castable product consists of 100 parts by weight of the reaction product polyalklene ether glycol, 13 parts by weight of a reacting agent 4,4' methylene bis–2–chloroaniline and a plasticizer to enhance low temperature flexibility of 15 parts by weight of dioctyl sebecate. This liquid composition will polymerize when cured under the influence of heat to form a solid product having good physical properties. These materials are available separately on a commercial basis. DuPont has a suitable polyurethane sold under the name of Adiprene L–100.

Figure 2:
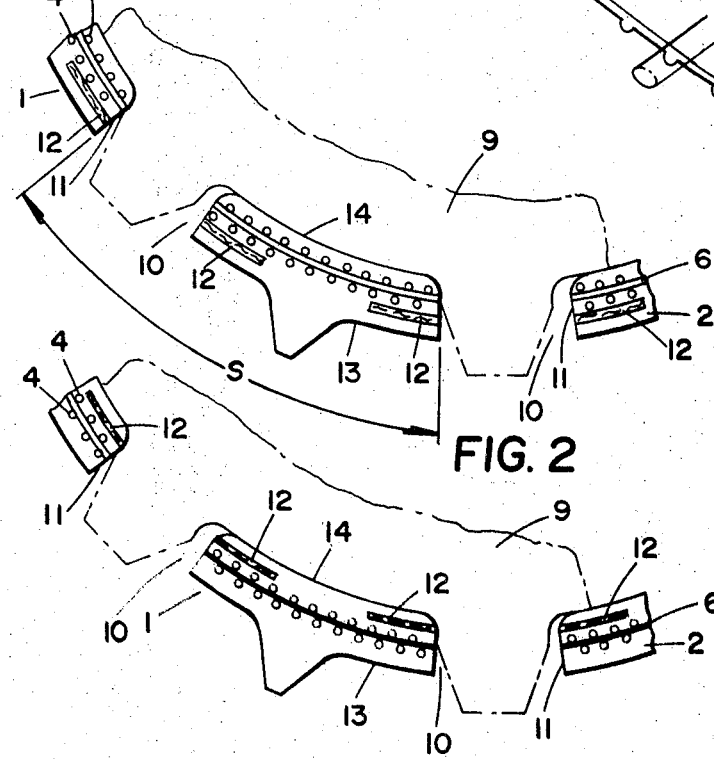
FIG. 2 is a sectional view of FIG. 1 taken along line 2–2 but showing variation in the textile reinforcement matrix.
Figure 3:
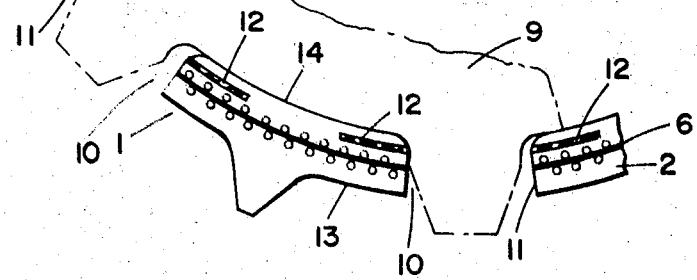
FIG. 3 is a sectional view similar to that of FIG. 2 but showing another variation in the textile reinforcement matrix.

The novel construction of the track makes it easily adaptable to a plurality of positive drive means. Referring to FIGS. 1, 2 and 3, one form of a positive drive means, a sprocket wheel 9, is shown in dotted form meshing with a section of endless track. The track 1 has a longitudinal row of evenly spaced sprocket teeth-receiving openings 10. The walls 11 defining the sprocket teeth-receiving openings provide a plurality of surfaces for receiving a positive drive means. Only one row of sprocket teeth-receiving openings is shown; however, more than one row of sprocket teeth-receiving openings 10 may be used in combination with additional sprocket wheels. The track 1 is readily adaptable to a plurality of spacings S between the sprocket teeth-receiving openings because holes may be punched in the track at any desired location. A salient feature of this invention is the lack of any transversely oriented metal stiffening members which might interfere with more than one spacing S on the sprocket teeth-receiving openings.

The track 1 as depicted by FIG. 1 will provide adequate service life when used in conjunction with some types of multiterrain vehicles. However, as the rotational speed and torque of the sprocket wheel are sizeably increased to affect the torque received by the track 1 or the rotational speed of the track 1, the sprocket teeth-receiving openings must be reinforced to insure adequate track service life. FIGS. 2 and 3 show a structural reinforcement adjacent to the sprocket teeth-receiving openings. A textile reinforcement member 12 for strengthening the opening is disposed within the elastomeric body 2 radially away from the sprocket teeth-receiving openings 10, a distance at least equivalent to one-half the dimension of the sprocket teeth-receiving openings. For ease of manufacture, the textile reinforcement member 12 may be in the form of a flat strip oriented longitudinally with respect to the elastomeric body 2. A preferred embodiment of this invention has a nonoriented textile fiber as the textile reinforcement member 12. Leno weave type fabric having the characteristics as previously described for the transverse reinforcement member 4 also is an effective textile reinforcement member 12.

The location of the textile reinforcement member 12 may be disposed within the elastomeric body 2 in a number of places. FIG. 2 depicts the textile reinforcement member 12, disposed within the elastomeric body 2 toward the outside surface 13 of the track 1 whereas FIG. 3 depicts the textile reinforcement member 12 disposed within the elastomeric body 2 toward the inner surface 14 of the track 1.

Figure 4:
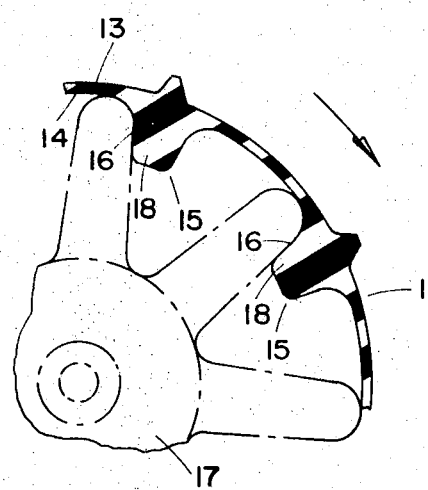
FIG. 4 is a sectional view similar to that of FIG. 2 but showing the track engaged with a theoretical star drive wheel.

The ease of adapting the track 1 to a completely different drive system is exemplified by FIG. 4. The track 1 has been modified to include at least one longitudinal row of evenly spaced lugs 15 made of the same material as the elastomeric body 2 and which lugs 15 project outwardly and away from the inner surface 14 of the track. The sides 16 of the lugs 15 provide a plurality of surfaces for receiving a positive drive means such as shown in dotted form as a star-shaped drive wheel 17. The edges 18 of the lugs 15 provide a plurality of surfaces which may be utilized to receive lateral forces such as might be necessary to maintain alignment of the track 1 with respect to a positive drive means.

Figure 5:
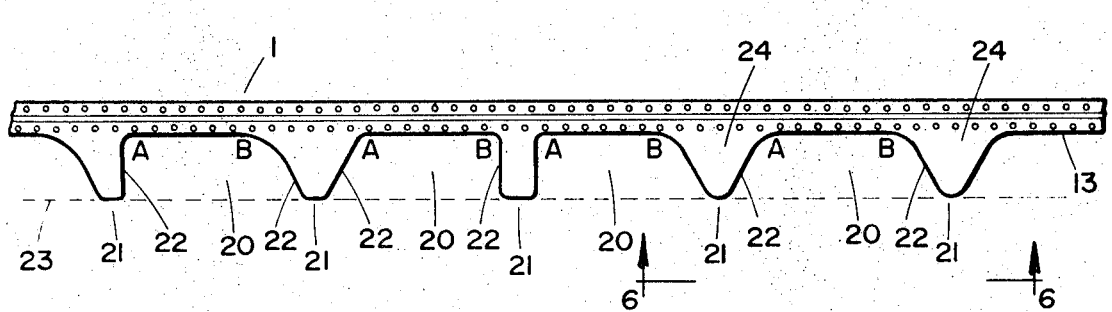
FIG. 5 is a sectional view of FIG. 1 along a longitudinal line showing the side view of the tread pattern.
Figure 6:
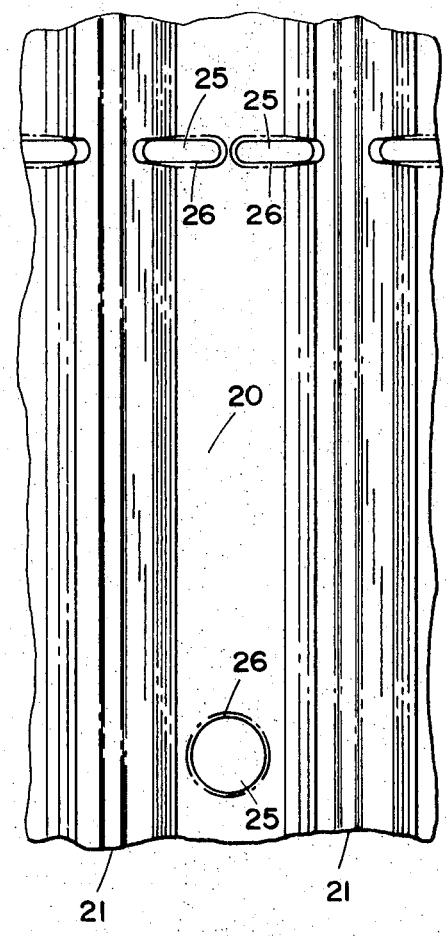
FIG. 6 is a plane view showing one element of the tread pattern.

The track 1 is adaptable to a plurality of tread patterns formed on its outside surface 13. The tread pattern may be of almost unlimited design since there are no transverse metal stiffening members around which a design must be based. An included embodiment of this invention is a track having a plurality of traction elements that provide superior traction in mud, snow or the like. The unique traction element has the characteristics as illustrated by FIG. 5. The traction element may best be described as a void 20 which is defined by at least two tread elements 21 that project outwardly and away from the outer surface 13 of the track 1. The tread elements are basically parallel to each other and are transversely oriented on the outer surface 13. The cross section of the void 20 is in the general shape of a trapezoid wherein the nonparallel sides 22 are defined by the tread elements 21 and the parallel sides are defined by the outer surface 13 of the track 1 and a theoretical ground level 23 which is shown in dotted form. As illustrated by FIG. 6, the tread elements 21 may have different cross sections to effect a trapezoidal void 20; however, a preferred embodiment of this invention has tread elements 21 having the same cross-sectional shape 24 for ease of manufacture. Superior traction in snow or the like is achieved through the voids 20 which have a trapezoidal cross section. The voids 20 serve to compact the snow or the like, through the nonparallel sides 22. The snow or the like is reduced in volume e.g. compacted, as it enters the void 20 because of the nonparallel sides 22. The compacted snow or the like has a greater resistance to being sheared than snow or the like which is not compacted. The tread elements 21 exert a force in the longitudinal direction L–L against the compacted snow or the like thereby giving superior traction.

The trapezoidal-shaped voids, to be effective, must compact the snow or the like. The summation of angles A and B may be varied to result in a plurality of trapezoidal-shaped voids. For an effective traction element 20 design, the summation of the angles A plus B must be greater than 200° but less than 300°. A preferred embodiment of this invention has a total included angle comprising angles A and B of 240°.

The traction elements 20 give superior traction generally in the longitudinal direction. FIG. 7 shows the addition of a longitudinal element 25 that projects outwardly and away from the outer surface 13 of the track 1 thereby enhancing stability and resistance to sideways slipping. The longitudinal element 25 need be of no special shape. It may be in the form of a disc, square, rectangle, et cetera, or a plurality or combination of each. The longitudinal element 25 provides a surface 26 to react against the snow or the like which has been compacted by the voids 20, as previously explained. The transverse tread element 21 and longitudinal element 25 provide normal traction when used over noncompactable terrain.

I claim:
1. An endless and substantially flat track for use with a multiterrain vehicle, said track having an inner and outer surface with a tread pattern on the outer surface, and said track capable of being propelled by a drive wheel, which comprises:
an elastomeric body;
a substantially endless textile tensile member oriented longitudinally with respect to the track, said textile tensile member disposed within said elastomeric body in generally uniformly laterally spaced relation substantially across the width of said elastomeric body;
a plurality of closely-spaced multifilament textile stiffening members arranged and spaced-apart by perpendicular cords separate from said tensile member providing a leno weave fabric oriented substantially perpendicularly with respect to said textile tensile member and disposed within said elastomeric body, said textile stiffening members having a bend modulus of at least 1.2 inch-pounds per longitudinal inch of said elastomeric body whereby the stiffness of the track transversely is greater than the stiffness of the track longitudinally; and a positive drive means for receiving a drive wheel from the inner surface of the track to propel the track.

2. An endless and substantially flat track as claimed in claim 1 wherein the elastomeric body is selected from the group consisting of natural rubber, styrenebutadiene rubber, chloroprene, acrylonitrile or polyurethane.

3. An endless and substantially flat track according to claim 1 wherein the elastomeric body is formed from castable polyurethane compounds.

4. An endless and substantially flat track according to claim 1 which further includes: at least one metal cable longitudinally arranged with respect to the track and disposed within the elastomeric body near each outside edge of the track to deter lateral tearing of the track.

5. An endless and substantially flat track as claimed in claim 1 wherein said means for receiving the drive wheel comprises at least one longitudinal row of evenly spaced lugs protruding from the inner surface of the track for engagement with the drive wheel.

6. An endless and substantially flat track as claimed in claim 1 wherein said means for receiving the drive wheel comprises said elastomeric body having at least one longitudinal row of evenly spaced sprocket teeth-receiving openings for engagement with the drive wheel.

7. An endless and substantially flat track as claimed in claim 6 and further including a substantially flat reinforcement member disposed around and away from said sprocket teeth-receiving openings a distance at least equivalent to the largest dimension of said sprocket teeth-receiving openings and said reinforcement member disposed within said elastomeric body.

8. An endless and substantially flat track as claimed in claim 1 wherein the means for receiving the drive wheel comprises said elastomeric body having at least one longitudinal row of evenly spaced sprocket teeth-receiving openings for meshing with the drive wheel, and at least one longitudinal row of evenly spaced lugs having drive surfaces for meshing with the drive wheel and having edges for transmitting lateral forces to the drive while, said lugs protruding outwardly and away from the inner surface of the substantially flat and endless track.

9. An endless and substantially flat track as claimed in claim 8 and further including a substantially flat reinforcement member disposed around and radially away from said sprocket teeth-receiving openings a distance at least equivalent to one-half the largest dimension of said sprocket teeth-receiving openings and said reinforcement member disposed within said elastomeric body.

10. An endless and substantially flat track according to claim 1 which further includes:
a plurality of substantially parallel tread elements having essentially flat sides that protrude outwardly and away from the outer surface of the endless and substantially flat track, the sides of said tread elements forming an angle of at least 90° with respect to the outer surface of the endless and substantially flat track, and the contiguous sides of any pair of said tread elements having a summation of angles as formed with respect to the outer surface of said endless and substantially flat track of between 200° and 300° whereby a trapezoidal-shaped void is formed between any two of said tread elements.

11. A traction tread according to claim 10 which further includes at least two spaced-apart transverse elements between every two of said tread elements, and said lateral elements protruding outwardly and away from the outer surface of said endless and substantially flat track a distance no further than the protruding tread elements.

12. An endless and substantially flat track for use with a multiterrain vehicle, said track having an inner and outer surface with a tread pattern of the outer surface, and said track capable of being propelled by a drive wheel, which comprises:
an elastomeric body of polyurethane;
a substantially endless textile tensile member oriented longitudinally with respect to the track, said textile tensile member disposed within said elastomeric body in generally uniformly laterally spaced relation substantially across the width of said elastomeric body;
a plurality of closely spaced multifilament textile stiffening members arranged and spaced-apart by perpendicular cords separate from said tensile member providing a leno weave fabric oriented substantially perpendicularly with respect to said textile tensile member and disposed within said elastomeric body whereby the stiffness of the track transversely is greater than the stiffness of the track longitudinally; and
a positive drive means for receiving a drive wheel from the inner surface of the track to propel the track.

13. An endless and substantially flat track according to claim 12 wherein said textile stiffening members in summation have a bend modulus of at least 1.2 inch-pounds per longitudinal inch of said elastomeric body.

14. An endless and substantially flat track as set forth in claim 12 wherein said means for receiving the drive wheel comprises at least one longitudinal row of evenly spaced lugs protruding from the inner surface of said track for engagement with the drive wheel.

15. An endless and substantially flat track according to claim 12 which further includes:
at least one metal cable longitudinally arranged with respect to the track and disposed within the elastomeric body near each outside edge of the track to deter lateral tearing of the track.

16. An endless and substantially flat track according to claim 12 which further includes:
a plurality of substantially parallel tread elements having essentially flat sides that protrude outwardly and away from the outer surface of the endless and substantially flat track, the sides of said tread elements forming an angle of at least 90° with respect to the outer surface of the endless and substantially flat track, and the contiguous sides of any pair of said tread elements having a summation of angles as formed with respect to the outer surface of said endless and substantially flat track of between 200° and 300° whereby a trapezoidal-shaped void is formed between any two of said tread elements.

17. A traction tread according to claim 16 which further includes: at least two spaced-apart transverse elements between every two of said tread elements, and said lateral elements protruding outwardly and away from the outer surface of said endless and substantially flat track a distance no further than the protruding tread elements.